(12) United States Patent
Morotomi

(10) Patent No.: US 10,785,462 B2
(45) Date of Patent: Sep. 22, 2020

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Emi Morotomi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/556,716

(22) Filed: Aug. 30, 2019

(65) Prior Publication Data

US 2020/0077069 A1 Mar. 5, 2020

(30) Foreign Application Priority Data

Sep. 4, 2018 (JP) .................. 2018-165430

(51) Int. Cl.
*H04N 9/797* (2006.01)
*G06K 9/00* (2006.01)
*G06K 9/20* (2006.01)
*H04N 19/146* (2014.01)
*H04N 9/793* (2006.01)

(52) U.S. Cl.
CPC ....... *H04N 9/7973* (2013.01); *G06K 9/00765* (2013.01); *G06K 9/00986* (2013.01); *G06K 9/2027* (2013.01); *H04N 9/793* (2013.01); *H04N 19/146* (2014.11)

(58) Field of Classification Search
CPC .... H04N 9/7973; H04N 9/793; H04N 19/146; G06K 9/00765; G06K 9/00986; G06K 9/2027
See application file for complete search history.

(56) References Cited

U.S. PATENT DOCUMENTS

2012/0249844 A1* 10/2012 Saito .................... H04N 5/2355
  348/242
2015/0356904 A1* 12/2015 Nakatani ................ G09G 5/377
  345/690

FOREIGN PATENT DOCUMENTS

JP 4878008 B 2/2012
JP 2018-026606 A 2/2018

* cited by examiner

*Primary Examiner* — Michael E Teitelbaum
(74) *Attorney, Agent, or Firm* — Cowan, Liebowitz & Latman, P.C.

(57) ABSTRACT

There is provided an image processing apparatus. An obtaining unit obtains a first image to which tone conversion processing conforming to a first input/output characteristic having a first maximum output luminance value has been applied. A generation unit generates first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied. A correction unit corrects a luminance value of the first image in conformity to the first correction information.

9 Claims, 19 Drawing Sheets

F I G. 7

COMPOSITE LUT (72)

| in | out | CORRECTION AMOUNT |
|---|---|---|
| 0 | 0 | 0 |
| 10 | 12 | +2 |
| 20 | 24 | +4 |
| ... | ... | ... |
| 290 | 294 | +4 |
| ... | ... | ... |
| 300 | 304 | +4 |
| 310 | 314 | +4 |
| ... | ... | ... |
| 490 | 491 | +1 |
| 500 | 500 | 0 |

↑

DIFFERENCE LUT

| in | out | CORRECTION AMOUNT |
|---|---|---|
| 0 | 0 | 0 |
| 10 | 10 | 0 |
| 20 | 20 | 0 |
| ... | ... | ... |
| 290 | 292 | +2 |
| 291 | 294 | +3 |
| ... | ... | ... |
| 300 | 304 | +4 |
| 310 | 314 | +4 |
| ... | ... | ... |
| 490 | 491 | +1 |
| 500 | 500 | 0 |

⊗

REFERENCE LUT (71)

| in | out | CORRECTION AMOUNT |
|---|---|---|
| 0 | 0 | 0 |
| 10 | 12 | +2 |
| 20 | 24 | +4 |
| ... | ... | ... |
| 290 | 291 | +1 |
| ... | ... | ... |
| 300 | 300 | 0 |
| 310 | 310 | 0 |
| ... | ... | ... |
| 490 | 490 | 0 |
| 500 | 500 | 0 |

FIG. 11A

THROUGH LUT

| IN | OUT |
|---|---|
| 0 | 0 |
| 2 | 2 |
| 14 | 14 |
| 16 | 16 |
| 18 | 18 |
| 20 | 20 |
| 22 | 22 |
| 28 | 28 |
| 30 | 30 |

SELECTED INPUT/OUTPUT CHARACTERISTIC

| INPUT VALUE | I VALUE |
|---|---|
| 0 | 0 |
| 1 | 4 |
| 2 | 8 |
| 3 | 12 |
| 4 | 18 |
| 5 | 20 |
| 6 | 24 |
| 7 | 28 |
| 8 | 29 |
| 9 | 30 |
| 10 | 30 |

REFERENCE INPUT/OUTPUT CHARACTERISTIC

| INPUT VALUE | I VALUE |
|---|---|
| 0 | 0 |
| 1 | 4 |
| 2 | 8 |
| 3 | 12 |
| 4 | 16 |
| 5 | 18 |
| 6 | 20 |
| 7 | 20 |
| 8 | 20 |
| 9 | 20 |
| 10 | 20 |

1101
1102
1103 ②

| FIG. 11A | FIG. 11B |
|---|---|

FIG. 11

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

In recent years, for example, the evolution of LED elements in displays has made it possible to display high-dynamic-range (hereinafter referred to as "HDR") image data as is without compressing the same. According to HDR, image presentation that exploits a high dynamic range is possible, and thus the colors and details of a high-luminance range that cannot be presented according to a conventional dynamic range (hereinafter referred to as "SDR") can be reproduced more authentically.

Along with this widespread use of HDR, there is demand for image creation that is suited for a subject and a scene in the case of HDR, similarly to SDR. For example, image creation that achieves brightness to reproduce a transparent skin color is preferred in a portrait scene, whereas image creation that makes blue sky and green vivid is preferred in landscape shooting. To realize these image presentations, the need arises to apply some sort of color/luminance correction to an original image signal.

There are two types of HDR: a PQ (Perceptual Quantization) method standardized in SMPTE ST2084, and an HLG (Hybrid Log Gamma) method developed by ARM STD-B67. A major difference between these two methods is that, while the HLG method treats luminance values in a relative manner similarly to SDR, the PQ method treats them as absolute luminances with a maximum of 10000 nits. Due to this difference, when shooting has been performed using the PQ method in a shooting mode in which an output dynamic range (D range) changes, a peak luminance at the time of presentation on a display changes. Hereinafter, it will be assumed that a description of HDR is based on the premise that the PQ method is used.

In FIG. 4, gamma curves 41, 42 represent examples of input/output characteristics that correspond to two types of shooting modes with different output D ranges. A horizontal axis represents the number of input stages, and a vertical axis represents an output luminance. Comparing the gamma curves of the respective shooting modes with each other, although they have the same input/output characteristic in a luminance range until the curves start to lie flat, they have different input/output characteristics in a range of luminances higher than that luminance range. As a result, the gamma curves 41, 42 respectively have different peak luminances 43, 44.

Returning to the description of color/luminance correction of HDR, FIGS. 5A to 5D show conceptual diagrams for a case where certain color/luminance correction has been applied to each of the images that have been developed in the two types of shooting modes shown in FIG. 4. FIG. 5A is a conceptual diagram of correction effects on a certain input luminance range in a shooting mode with a low peak luminance in connection with the certain color/luminance correction, and FIG. 5B is a conceptual diagram of correction effects on a lower input luminance range in connection with the same color/luminance correction. FIG. 5C is a conceptual diagram of correction effects on the same input luminance range as FIG. 5A in a shooting mode with a high peak luminance in connection with the same color/luminance correction, and FIG. 5D is a conceptual diagram of ideal correction effects in the shooting mode of FIG. 5C. In FIG. 5C, although the same correction has been applied to the same input luminance range as in FIG. 5A, a deficiency in correction amounts is sensed due to the difference in the output D range. Therefore, in order to achieve correction effects that are equivalent to correction effects achieved in a shooting mode with a low peak luminance also in a shooting mode with a high peak luminance, it is necessary to achieve the effects of FIG. 5D by applying correction that is equivalent to correction to an input luminance range lower than a target input luminance range shown in FIG. 5B.

As described above, according to HDR, as there is a case where a difference in a peak luminance arises depending on a shooting mode, there is a case where a deficiency or an excess in correction amounts shown in FIGS. 5A to 5D occurs if the same correction is applied in disregard of such a difference. This is because, when a peak luminance is high, tone properties are enhanced and thus color reproduction in a high-luminance range is improved compared to when a peak luminance is low. Therefore, even with the same input signal, the brightness and chroma differ depending on a shooting mode, thereby generating a difference in correction effects as well. Consequently, in order to achieve appropriate correction effects in any shooting mode, the need arises to change correction amounts in accordance with a change in a peak luminance.

Referring to Japanese Patent No. 4878008, it discloses a brightness/chroma/hue correction method that enables appropriate color reproduction even when the presentable gamut differs depending on an output device. Next, referring to Japanese Patent Laid-Open No. 2018-026606, it discloses a color/luminance correction approach for reproducing original tone properties of HDR when an image obtained through HDR shooting is displayed on an SDR monitor.

Japanese Patent No. 4878008 does not describe HDR image output. On the other hand, the correction approach of Japanese Patent Laid-Open No. 2018-026606 is the correction approach at the time of compressing a peak luminance from an HDR luminance value to an SDR luminance value, and an image that is output using this approach is not an HDR image but an SDR image. Conventionally, a technique to effectively apply luminance correction for an HDR image in accordance with a change in an output D range has been unknown.

SUMMARY OF THE INVENTION

The present invention has been made in view of the aforementioned situations, and provides a technique to enable luminance correction in accordance with a maximum output luminance value of an input/output characteristic of tone conversion processing that was applied to an image to be corrected.

According to a first aspect of the present invention, there is provided an image processing apparatus comprising at least one processor and/or at least one circuit which function as: an obtaining unit configured to obtain a first image to which tone conversion processing conforming to a first input/output characteristic having a first maximum output luminance value has been applied; a generation unit configured to generate first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied; and a correction unit configured to correct a luminance value of the first image in conformity to the first correction information.

According to a second aspect of the present invention, there is provided an image capturing apparatus, comprising: the image processing apparatus according to the first aspect; and at least one processor and/or at least one circuit which function as: an image capturing unit; and an image generation unit configured to generate the first image by applying the tone conversion processing conforming to the first input/output characteristic to an image generated by the image capturing unit.

According to a third aspect of the present invention, there is provided an image processing method executed by an image processing apparatus, comprising: obtaining a first image to which tone conversion processing conforming to a first input/output characteristic having a first maximum output luminance value has been applied; generating first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied; and correcting a luminance value of the first image in conformity to the first correction information.

According to a fourth aspect of the present invention, there is provided a non-transitory computer-readable storage medium which stores a program for causing a computer to execute an image processing method comprising: obtaining a first image to which tone conversion processing conforming to a first input/output characteristic having a first maximum output luminance value has been applied; generating first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied; and correcting a luminance value of the first image in conformity to the first correction information.

Further features of the present invention will become apparent from the following description of exemplary embodiments with reference to the attached drawings.

BRIEF DESCRIPTION OF THE DRAWINGS

FIG. 7 is a diagram for describing processing for generating a composite LUT.

FIGS. 11A and 11B are diagrams for describing the processing for generating the difference LUT according to the first embodiment.

DESCRIPTION OF THE EMBODIMENTS

Figure 1:
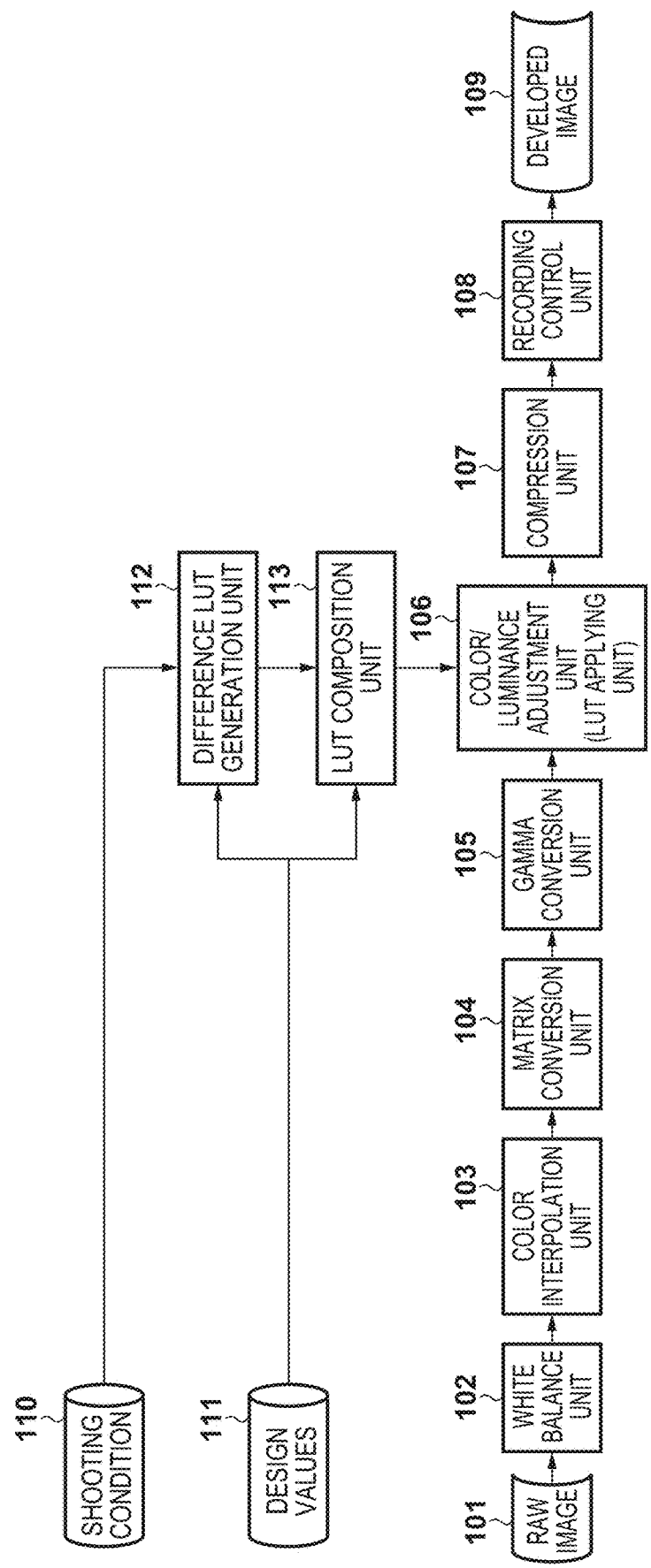
FIG. 1 is a diagram for describing the development of a RAW image according to a first embodiment.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

Note that in the following embodiments, a description will be given of a digital camera, which serves as one example of an image processing apparatus. However, the following embodiments are not limited to a device that mainly aims to perform shooting, like a digital camera. For example, the following embodiments are applicable to any device that includes an image processing apparatus built therein or is connected to an external image processing apparatus, like a mobile telephone, a personal computer (e.g., a laptop type, a desktop type, and a tablet type), and a game device.

First Embodiment

Figure 2:
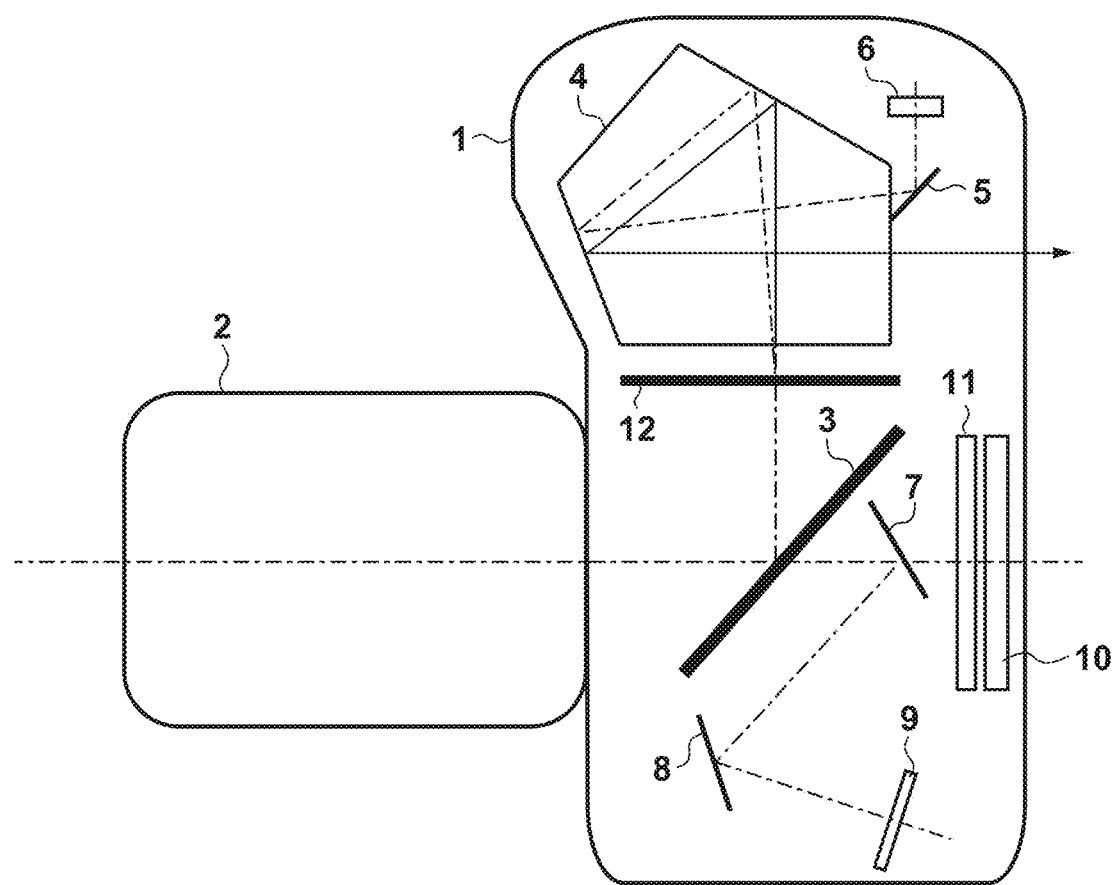
FIG. 2 is a cross-sectional diagram showing the arrangement of mainly optical members, sensors, and the like of a digital camera, which is one example of an image processing apparatus.

FIG. 2 is a cross-sectional diagram showing the arrangement of mainly optical members, sensors, and the like of a digital camera, which is one example of an image processing apparatus. The digital camera of the present embodiment is a so-called digital single-lens reflex camera of an interchangeable lens type, and includes a camera main body 1 and an interchangeable lens 2. In the camera main body 1, an image sensor 10 is, for example, a CMOS image sensor or a CCD image sensor, and a plurality of pixels (storage-type photoelectric conversion elements) are arrayed therein. A mechanical shutter 11, which is provided in the vicinity of the front of the image sensor 10, controls an exposure timing and an exposure period of the image sensor 10. A semi-transmissive main mirror 3 and a first reflective mirror 7 arranged on the back side of the main mirror 3 are flipped up at the time of shooting. A second reflective mirror 8 further reflects a light beam reflected by the first reflective mirror 7, and makes the light beam incident on an AF sensor 9 (a sensor for focus detection). The AF sensor 9 may be, for example, an image sensor that has a smaller number of pixels than the image sensor 10. The first reflective mirror 7, the second reflective mirror 8, and the AF sensor 9 are constituents for performing focus detection using a phase difference detection method at an arbitrary position inside a shooting screen. An AE sensor 6 (a sensor for metering) receives light of an image on the shooting screen reflected by a pentaprism 4 and a third reflective mirror 5. The AE sensor 6 can divide a light receiving portion into a plurality of regions, and output luminance information of a subject on a region-by-region basis. There is no limitation on the division number. Note that in the image sensor, for example, an amplifier circuit for a pixel signal and a peripheral circuit for signal processing are formed, in addition to the pixels arranged in the light receiving portion. The pentaprism 4 constitutes a finder optical system. Although not illustrated in FIG. 2, a subject image reflected by the pentaprism 4 can be observed from an eyepiece. Among the light rays that have been reflected by the main mirror 3 and diffused by a focusing screen 12, a portion that is outside an optical axis becomes incident on the AE sensor 6. The interchangeable lens 2 performs information communication with the camera main body 1 as necessary via a contact point of a lens mount provided in the camera main body 1. Note that at the time of live-view display and at the time of moving image recording, the main mirror 3 is always in a flipped-up state, and thus exposure control and focus adjustment control are performed using image information of an image capturing surface.

Figure 3:
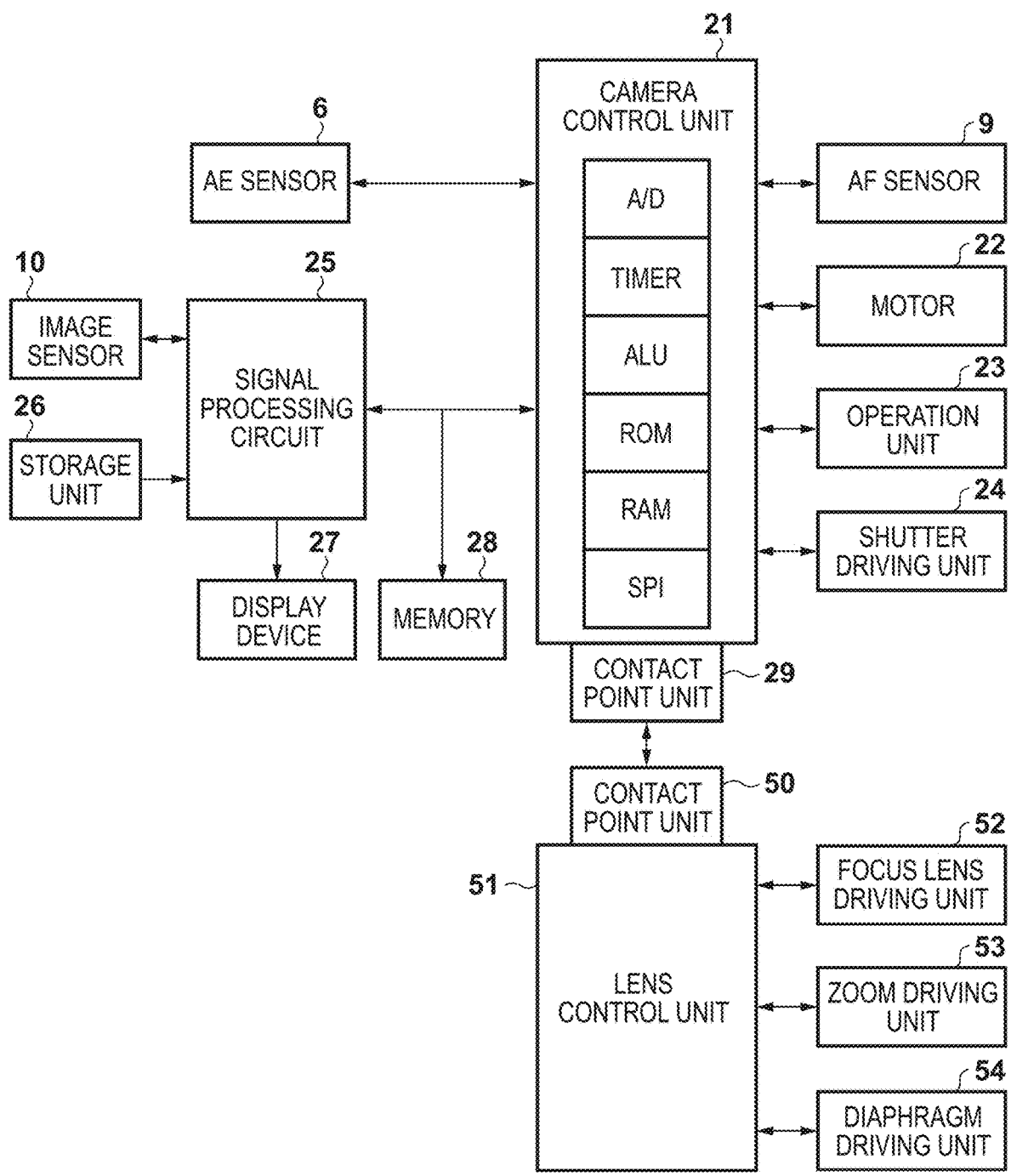
FIG. 3 is a block diagram showing exemplary configurations of electrical circuits of a camera main body 1 and an interchangeable lens 2.
Figure 4:
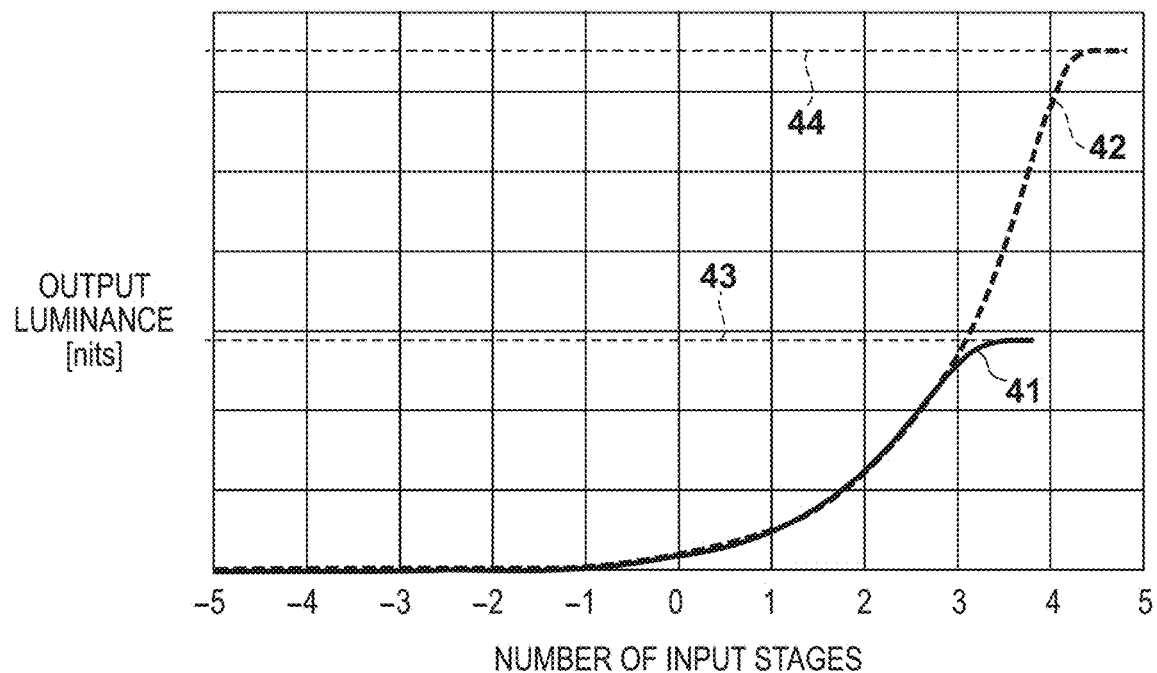
FIG. 4 is a diagram showing examples of input/output characteristics with different output D ranges.
Figure 5A:
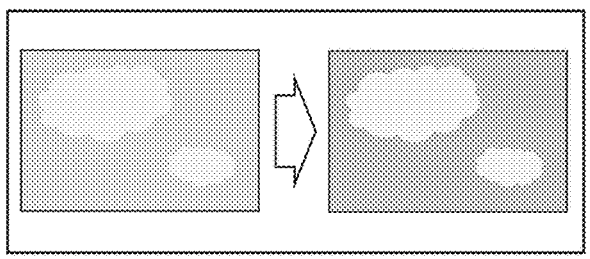
FIGS. 5A to 5D are diagrams for describing a deficiency or an excess in correction amounts attributed to a difference in a peak luminance.
Figure 5B:
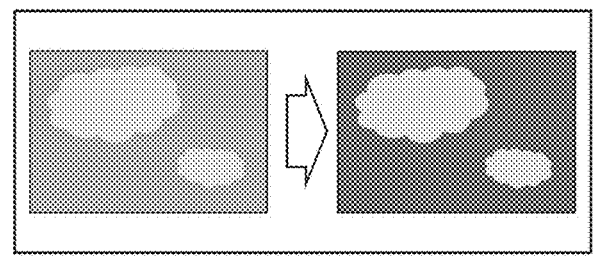
Figure 5C:
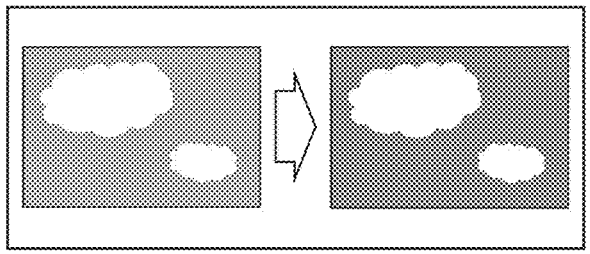
Figure 5D:
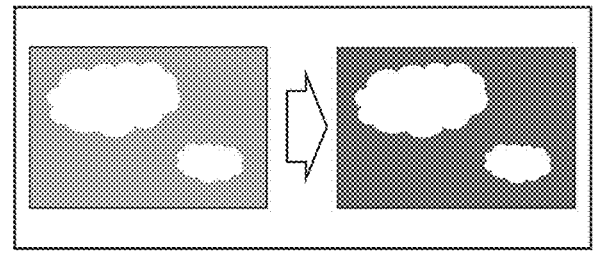

FIG. 3 is a block diagram showing exemplary configurations of electrical circuits of the camera main body 1 and the interchangeable lens 2 shown in FIG. 2. In the camera main body 1, a camera control unit 21 is a single-chip microcomputer that includes, for example, an ALU (ARITHMETIC and Logic Unit), a ROM, a RAM, an A/D converter, a timer, a serial communication port (SPI), and the like built therein. The camera control unit 21 controls the operations of the camera main body 1 and the interchangeable lens 2 by, for example, executing programs stored in the ROM. Specific operations of the camera control unit 21 will be described later.

Output signals from the AF sensor 9 and the AE sensor 6 are connected to an A/D converter input terminal of the camera control unit 21. A signal processing circuit 25 controls the image sensor 10 in accordance with an instruction from the camera control unit 21, applies A/D conversion and signal processing to a signal output from the image sensor 10, and obtains an image signal. Furthermore, in recording the obtained image signal, the signal processing circuit 25 performs necessary image processing, such as compression and composition. A memory 28 is a DRAM or the like, and it is used as a working memory when the signal processing circuit 25 performs various types of signal processing, and is used as a VRAM when an image is displayed on a display device 27, which will be described later. The display device 27 is, for example, a back-surface liquid crystal display or an external display that is connected to the camera main body 1 in conformity to the standards of HDMI™ or the like. The display device 27 displays information, such as setting values of the digital camera, a message, and a menu screen, and captured images. The display device 27 is controlled by an instruction from the camera control unit 21. A storage unit 26 is, for example, a non-volatile memory, such as a flash memory, and a captured image signal is input thereto from the signal processing circuit 25.

Under control of the camera control unit 21, a motor 22 flips up and down the main mirror 3 and the first reflective mirror 7, and charges the mechanical shutter 11. An operation unit 23 is an input device group including, for example, switches that are used by a user to operate the digital camera. The operation unit 23 includes, for example, a release switch for issuing instructions for starting a shooting preparation operation and starting shooting, a shooting mode selection switch for selecting a shooting mode, directional keys, and an enter key. A contact point unit 29 is a contact point for performing communication with the interchangeable lens 2, and an input/output signal of the serial communication port of the camera control unit 21 is connected thereto. A shutter driving unit 24 is connected to an output terminal of the camera control unit 21, and drives the mechanical shutter 11.

The interchangeable lens 2 includes a contact point unit 50 that is paired with the contact point unit 29. A lens control unit 51, which is a single-chip microcomputer similar to the camera control unit 21, is connected to the contact point unit 50, and the lens control unit 51 can perform communication with the camera control unit 21. The lens control unit 51 controls the operations of the interchangeable lens 2 based on an instruction from the camera control unit 21 by executing programs stored in, for example, the ROM. The lens control unit 51 also notifies the camera control unit 21 of information of, for example, the state of the interchangeable lens 2. A focusing lens driving unit 52 is connected to an output terminal of the lens control unit 51, and drives a focusing lens. A zoom driving unit 53 changes the angle of view of the interchangeable lens under control of the lens control unit 51. A diaphragm driving unit 54 adjusts an aperture size of a diaphragm under control of the lens control unit 51.

When the interchangeable lens 2 is attached to the camera main body 1, the lens control unit 51 and the camera control unit 21 can perform data communication with each other via the contact point units 29, 50. Furthermore, electric power for driving motors and actuators inside the interchangeable lens 2 is also supplied via the contact point units 29, 50. For example, lens-specific optical information and information related to a subject distance based on a distance encoder, which are necessary for the camera control unit 21 to perform focus detection and exposure computation, are output from the lens control unit 51 to the camera control unit 21 through data communication. Furthermore, focus adjustment information and diaphragm information that have been obtained as a result of the focus detection and the exposure computation performed by the camera control unit 21 are output from the camera control unit 21 to the lens control unit 51 through data communication. The lens control unit 51 controls the focusing lens in accordance with the focus adjustment information, and controls the diaphragm in accordance with the diaphragm information.

The following describes specific operations from shooting to development in the first embodiment. Once the camera control unit 21 is rendered operable by, for example, turning ON a power switch included in the operation unit 23 (FIG. 3), the camera control unit 21 first performs communication with the lens control unit 51 of the interchangeable lens 2, and performs initialization processing for, for example, obtaining information of various types of lenses necessary for focus detection and metering. Furthermore, in the operation unit 23, various types of user settings are accepted, and an arbitrary shooting mode is set. When an operation of pressing the release switch included in the operation unit 23 halfway has been performed, the camera control unit 21 starts the shooting preparation operation, such as AF (autofocus) processing and AE (automatic exposure) processing. Thereafter, when an operation of fully pressing the release switch has been performed, the camera control unit 21 performs a shooting operation.

When the shooting operation is performed, light that has passed through the interchangeable lens 2 is converted into an electrical signal by the image sensor 10. Image data generated from this electrical signal is referred to as a RAW image. Once the RAW image is generated, the signal processing circuit 25 performs development processing.

With reference to FIG. 1, a description is now given of the development of the RAW image according to the first embodiment. Note that the functions of respective units shown in FIG. 1 can be implemented by, for example, the camera control unit 21, the signal processing circuit 25, or a combination of these.

Each pixel of a RAW image 101 has intensity only in a single color plane. A white balance unit 102 performs processing for reproducing white by correcting a color cast attributed to a light source. Specifically, the white balance unit 102 plots RGB data of each pixel in a predetermined color space, such as an xy color space for example, and resultant G, R, and B of data plotted near a black-body radiation locus, which has a high possibility of representing the color of the light source in that color space, are integrated. Then, the white balance unit 102 obtains white balance coefficients G/R and GB for an R component and a B component from the integrated value. The white balance unit 102 implements white balance processing using the white balance coefficients generated through the foregoing processing.

Figure 6:
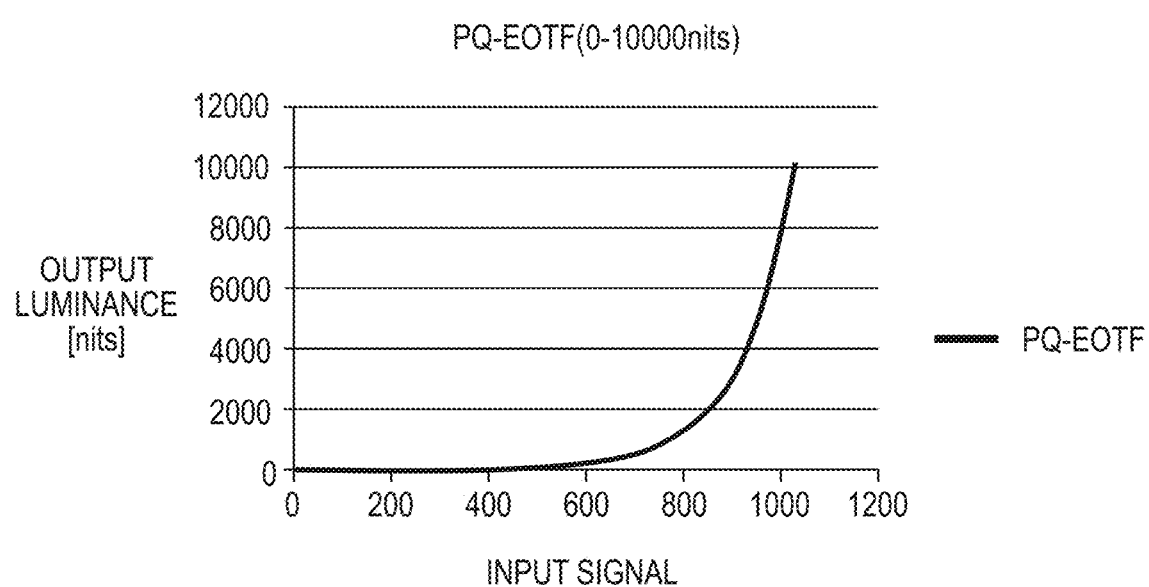
FIG. 6 is a diagram showing the PQ-EOTF.

A color interpolation unit 103 generates a color image in which every pixel has complete RGB color information by performing noise reduction and RAW image interpolation processing. The generated color image undergoes processing in a matrix conversion unit 104 and a gamma conversion unit 105. As a result, a basic color image (an image to be corrected) is generated (image generation processing). The gamma characteristic in the case of HDR development in the gamma conversion unit 105 is, for example, the inverse characteristic of the EOTF (Electro-Optical Transfer Function) (FIG. 6) of PQ (Perceptual Quantization). However, as the gamma characteristic, the OOTF (Opto-Optical Transfer Function) characteristic may be combined.

Thereafter, a color/luminance adjustment unit 106 performs processing for improving the image appearance with respect to the color image. Here, for example, image correction for increasing the brightness in the case of portrait, enhancing the chroma of green and blue sky in the case of landscape, and the like is performed. This image correction is executed by, for example, applying a lookup table (LUT) for color/luminance adjustment to color signal values of RGB and the like.

Furthermore, particularly in the first embodiment, the color/luminance adjustment unit 106 performs adjustment processing (correction processing) with respect to a luminance component of the color image (regarded here as an I value). The I value is a luminance evaluation value calculated from an ICtCp color space in which even a high-luminance range that can be presented using HDR can be evaluated. The camera main body 1 holds in advance, as design values 111, a luminance adjustment LUT (reference LUT, second correction information) intended for a shooting mode corresponding to an input/output characteristic (reference input/output characteristic, second input/output characteristic) having a peak luminance that serves as a reference (a second maximum output luminance value). A difference LUT generation unit 112 generates an LUT (difference LUT) that is equivalent to differences from correction amounts in a high-luminance range of the reference LUT in accordance with a peak luminance (first maximum output luminance value) of an input/output characteristic (selected input/output characteristic, first input/output characteristic) corresponding to a shooting mode that is selected at the time of shooting. The details of processing for generating the difference LUT (third correction information) will be described later. An LUT composition unit 113 composites the reference LUT and the difference LUT, thereby generating a new luminance adjustment LUT (composite LUT) in which the correction amounts in the high-luminance range of the reference LUT have been changed. The details of processing for generating the composite LUT (first correction information) will be described later. The color/luminance adjustment unit 106 adjusts (corrects) the luminance values of the color image by applying the composite LUT to the color image. Upon completion of processing in the color/luminance adjustment unit 106, a compression unit 107 compresses a high-resolution image in compliance with the standards of HEVC or the like. A recording control unit 108 records the compressed image into the storage unit 26 as a developed image 109.

With reference to FIGS. 10A, 10B, 11A, and 11B, the following describes the details of the processing performed by the difference LUT generation unit 112 for generating the difference LUT. In step S1000, the difference LUT generation unit 112 obtains a shooting condition 110 (FIG. 1), and determines a shooting mode. The camera main body 1 has a shooting mode that gives priority to high-luminance tone properties (a tone priority mode), in addition to a normal shooting mode (a normal mode), and the user selects which one of the shooting modes is to be used during the shooting in accordance with a scene to be shot. Between these two shooting modes, there is a difference in a peak luminance when a shot image has been developed using HDR. Therefore, information indicating which shooting mode was used during the shooting can be used to generate the difference LUT. In the following description, it will be assumed that the normal mode corresponds to the aforementioned reference input/output characteristic (the second input/output characteristic having the second maximum output luminance value). It will also be assumed that the tone priority mode has been selected by the user, and the tone priority mode corresponds to the aforementioned selected input/output characteristic (the first input/output characteristic having the first maximum output luminance value).

In step S1001, the difference LUT generation unit 112 obtains the reference input/output characteristic and the selected input/output characteristic from the design values 111 (FIG. 1). In step S1002, the difference LUT generation unit 112 obtains the reference LUT (the LUT for correcting the luminance values of an image to which tone conversion processing conforming to the reference input/output characteristic has been applied) from the design values 111 (FIG. 1).

In step S1003, the difference LUT generation unit 112 generates a through LUT having the same grid as the reference LUT. The through LUT is the LUT in which, as shown in FIG. 11A for example, the same values are set under IN (input) and OUT (output) for each grid point (each information portion) of the LUT.

In step S1004, the difference LUT generation unit 112 determines whether the number of processed grid points in the through LUT is smaller than the total number of grid points. If the number of processed grid points is smaller than the total number of grid points, the processing proceeds to step S1005, and if the number of processed grid points is not smaller than the total number of grid points, the processing of the present flowchart ends.

In step S1005, the difference LUT generation unit 112 reads out an input value (I value) of one unprocessed grid point in the through LUT. As a result of repeatedly performing the determination in step S1004 and the readout in step S1005, all of the grid points in the through LUT are processed eventually.

In step S1006, the difference LUT generation unit 112 obtains an input signal value by performing a reverse lookup based on the selected input/output characteristic with respect to the I value that was read out in step S1005. For example, as indicated by reference sign 1101 of FIG. 11A, when the I value (IN in the through LUT) that was read out in step S1005 is 18, the input signal value of the selected input/output characteristic is 4.

In step S1007, the difference LUT generation unit 112 obtains, from the reference input/output characteristic, an output value (I value) corresponding to the input signal value that was obtained in step S1006. In the case of the example of FIGS. 11A and 11B, as indicated by reference sign 1102, 16 is obtained as the I value from the reference input/output characteristic.

In step S1008, with reference to the reference LUT, the difference LUT generation unit 112 obtains a correction amount corresponding to the I value that was obtained in step S1007. In the case of the example of FIGS. 11A and 11B, as indicated by reference sign 1103, "+2" is obtained as the correction amount.

In step S1009, the difference LUT generation unit 112 adds the correction amount that was obtained in step S1008 to an output value of the grid point to be processed in the through LUT (the grid point corresponding to the I value that was read out in step S1005). In the case of the example of FIGS. 11A and 11B, as indicated by reference sign 1104, "+2" is added to an output value corresponding to the input signal value "18", thereby associating the input signal value "18" with the output value "20" in the through LUT. Note that the value that is added to the output value in the through LUT here need not necessarily be equal to the correction amount that was obtained in step S1008, as long as the added value is a value based on this correction amount.

In step S1010, the difference LUT generation unit 112 rewrites the input signal value of the grid point to be processed (the grid point corresponding to the I value that was read out in step S1005) into an output value that is obtained by correcting this input signal value in accordance with the reference LUT. In the case of the example of FIGS. 11A and 11B, as indicated by reference sign 1105, the input signal value "18" is rewritten into "19". As a result, the difference LUT having a grid point at which the input signal value "19" and the output value "20" are associated with each other is generated.

Thereafter, the processing returns to step S1004, and similar processing is repeated with respect to all of the grid points. As a result, the processing for generating the difference LUT is completed.

Although the above has described the figures with the assumption of variable-grid LUTs by way of example, values can be obtained through interpolation from the preceding and succeeding characteristics in the case of a fixed grid. Furthermore, in a case where a target value does not exist at the time of, for example, obtaining a correction amount from the reference LUT based on an output value (I value), the value can be calculated through interpolation processing on an as-needed basis.

Figure 8A:
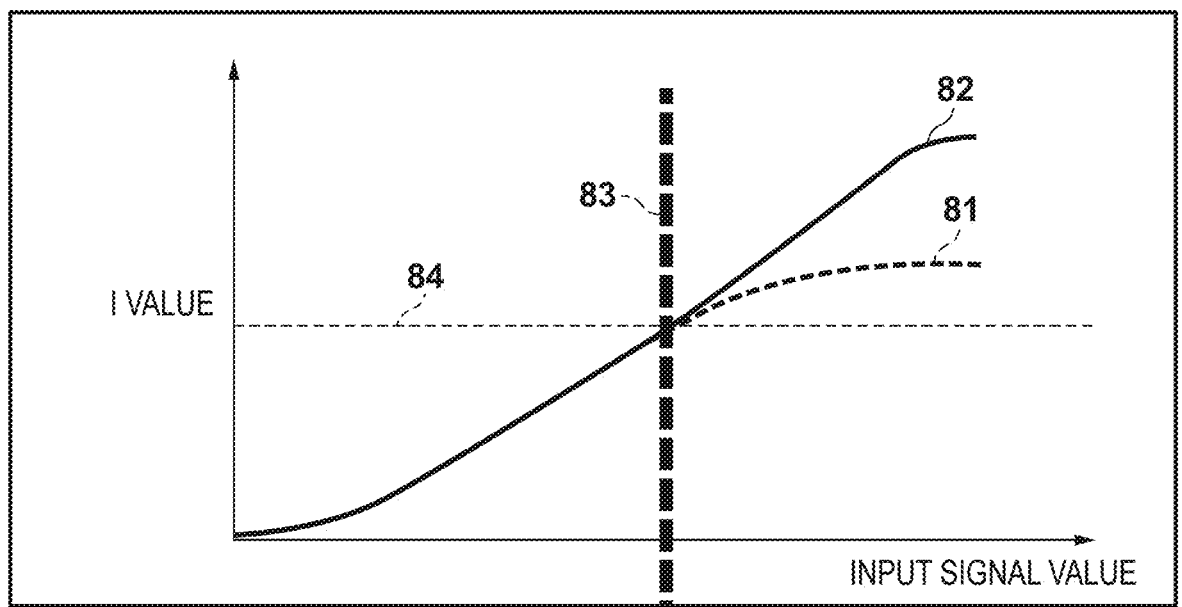
FIGS. 8A and 8B are diagrams showing a difference in an output luminance value between a reference input/output characteristic and a selected input/output characteristic.
Figure 8B:
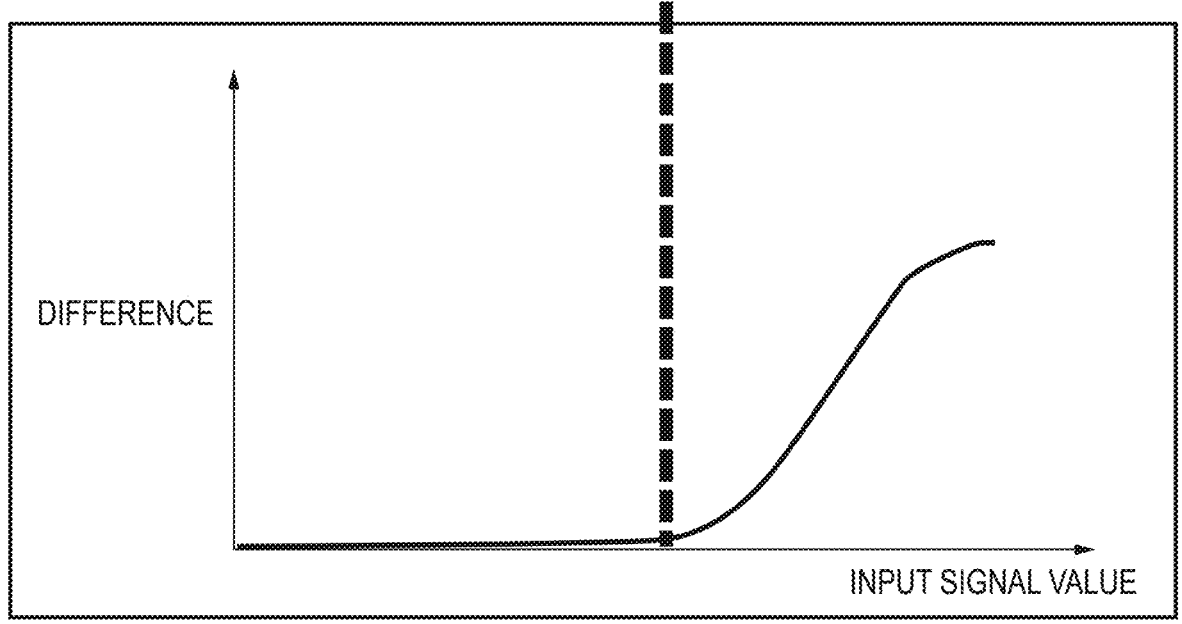
Figure 9:
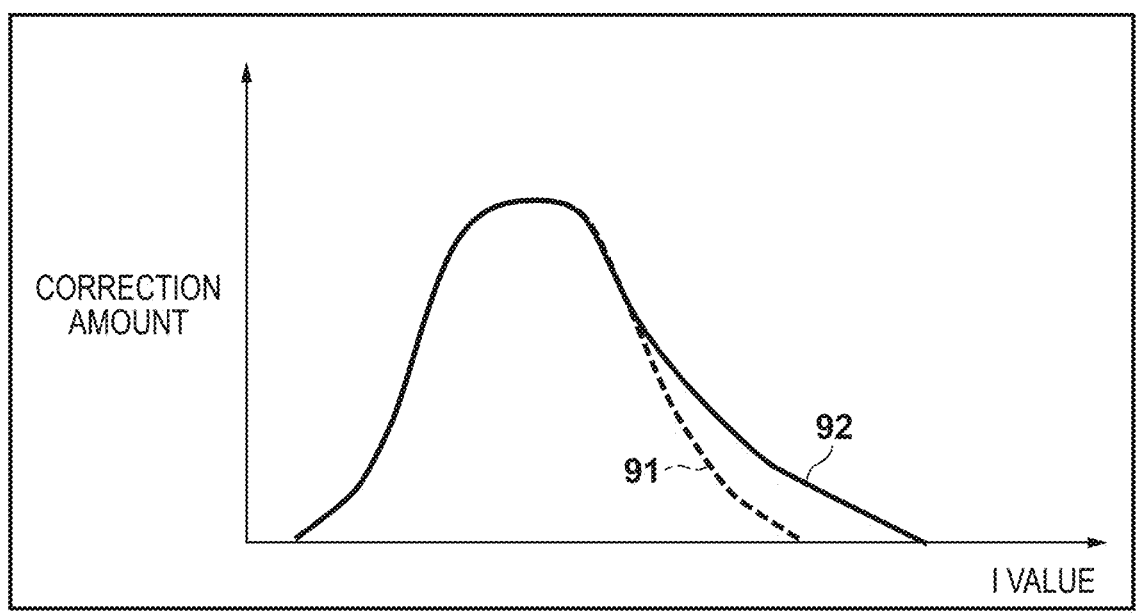
FIG. 9 is a diagram showing a difference between a reference LUT and the composite LUT according to the first embodiment.

Next, with reference to FIGS. 7 to 9, the details of the processing performed by the LUT composition unit 113 for generating the composite LUT will be described. As shown in FIG. 7, the LUT composition unit 113 generates the composite LUT by applying the difference LUT to output values in the reference LUT. A correction range 72 of the composite LUT thus obtained is larger than a correction range 71 of the reference LUT. Therefore, with use of the composite LUT, correction is applied also to a high-luminance range that is outside the correction range of the reference LUT. FIG. 9 is a diagram showing a difference between the reference LUT and the composite LUT according to the first embodiment. In FIG. 9, a horizontal axis represents an I value, and a vertical axis represents a correction amount. A correction amount 91 represents a correction amount according to the reference LUT, and a correction amount 92 represents a correction amount according to the composite LUT. As can be understood from the comparison between the correction amount 91 and the correction amount 92, with use of the composite LUT, correction is applied also to a high-luminance range that is outside the correction range of the reference LUT. Furthermore, regarding a luminance range in which there is no difference in the output luminance value, there is no difference in the correction amount, either. FIG. 8A shows examples of the input/output characteristics corresponding to two types of shooting modes with different peak luminances, and FIG. 8B shows an example of a difference in an output value (I value) between the shooting modes of FIG. 8A. In FIG. 8A, a horizontal axis represents an input signal value, and a vertical axis represents an I value. In FIG. 8B, a horizontal axis represents an input signal value, and a vertical axis represents a difference in an I value. Also, it will be assumed that a gamma curve 81 corresponds to the normal mode, and a gamma curve 82 corresponds to the tone priority mode. As can be understood from FIGS. 8A and 8B, in a high-luminance range in which the input signal value exceeds a threshold 83, a difference arises in the output value (I value). In a region where such a difference arises in the output value (I value), a difference arises between the reference LUT and the composite LUT.

As described above, according to the first embodiment, the camera main body 1 generates the composite LUT based on differences related to output luminance values (differences in output luminance values for respective input values) between the selected input/output characteristic and the reference input/output characteristic, and on the reference LUT. This enables luminance correction in accordance with the maximum output luminance value of the input/output characteristic of tone conversion processing that was applied to an image to be corrected.

Second Embodiment

The first embodiment has focused on differences in output luminance values for respective input values between the selected input/output characteristic and the reference input/output characteristic, as differences related to output luminance values between the selected input/output characteristic and the reference input/output characteristic. The second embodiment focuses on differences in the inclinations of output luminance values for respective input values between the selected input/output characteristic and the reference input/output characteristic, as differences related to output luminance values between the selected input/output characteristic and the reference input/output characteristic. In the present embodiment, a basic configuration of the digital camera is similar to that of the first embodiment (see FIGS. 2 and 3). The following mainly describes differences from the first embodiment.

Figure 12:
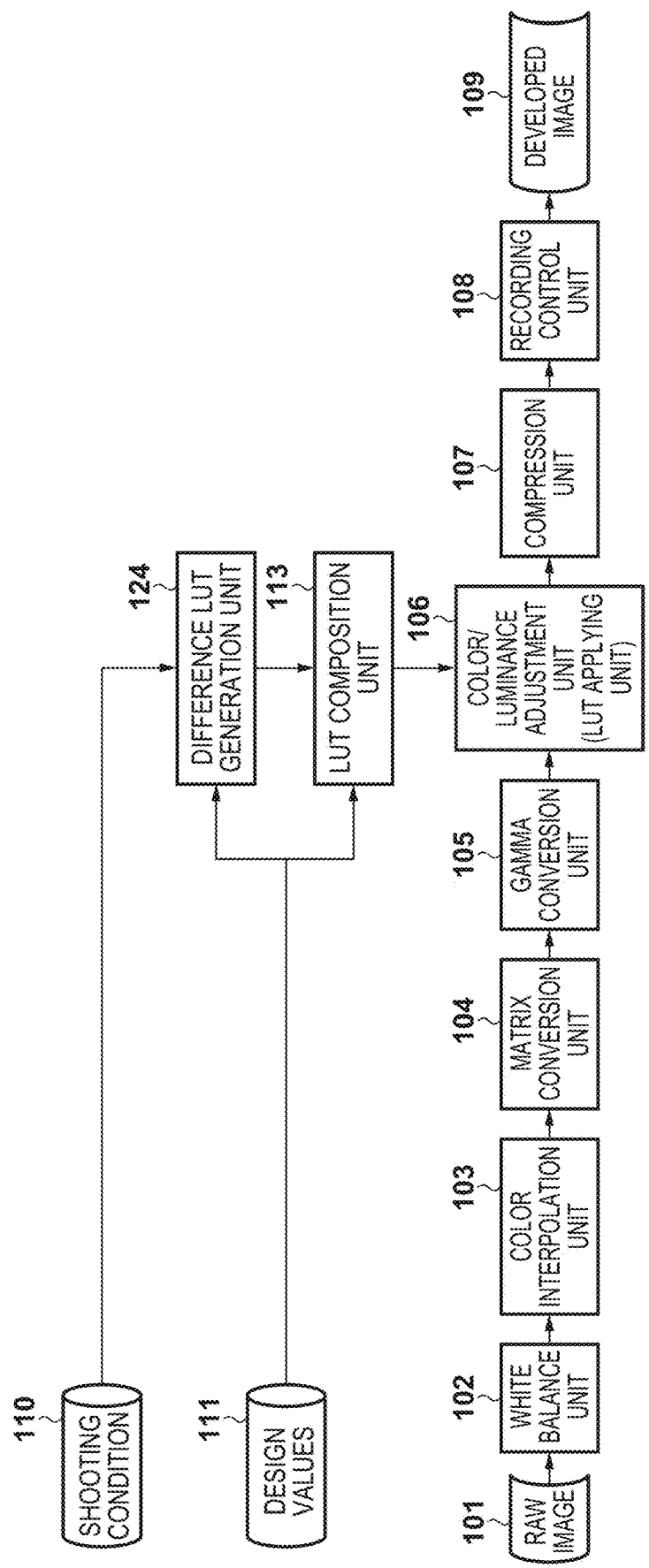
FIG. 12 is a diagram for describing the development of a RAW image according to a second embodiment.

With reference to FIG. 12, a description is now given of the development of a RAW image according to the second embodiment. In FIG. 12, the difference LUT generation unit 112 of FIG. 1 is replaced with a difference LUT generation unit 124. Other constituents are similar to those of the first embodiment. After obtaining a shooting condition 110 and design values 111, the difference LUT generation unit 124 generates a difference LUT in accordance with inclinations calculated from gamma data (an input/output characteristic).

Figure 13A:
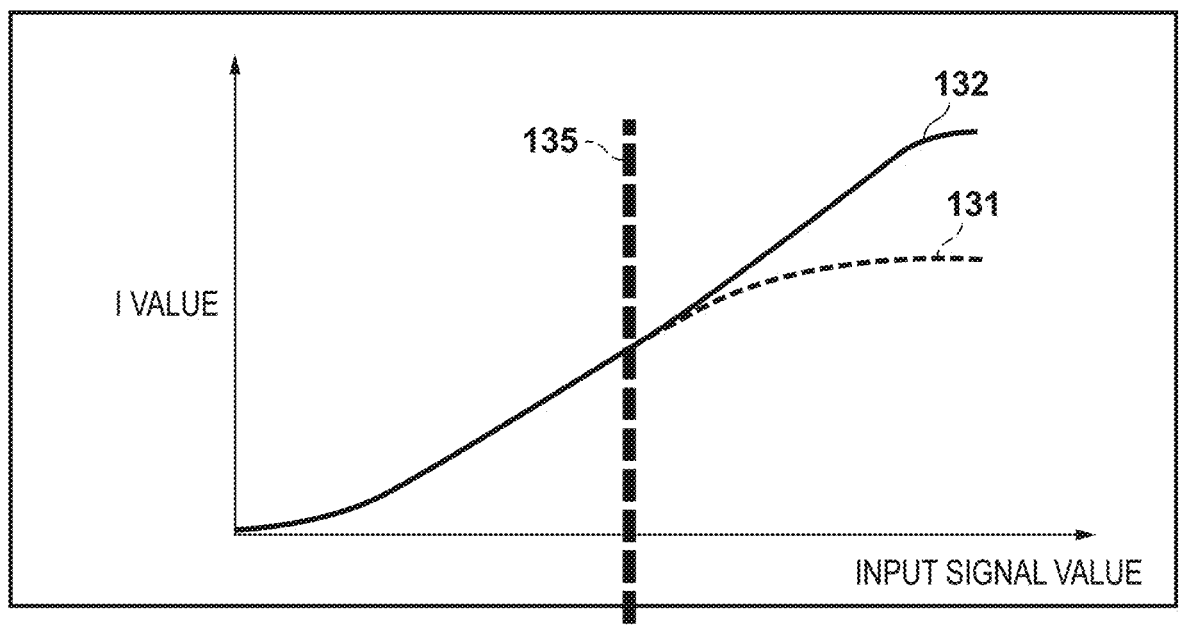
FIGS. 13A and 13B are diagrams showing a difference in an inclination between a reference input/output characteristic and a selected input/output characteristic.
Figure 13B:
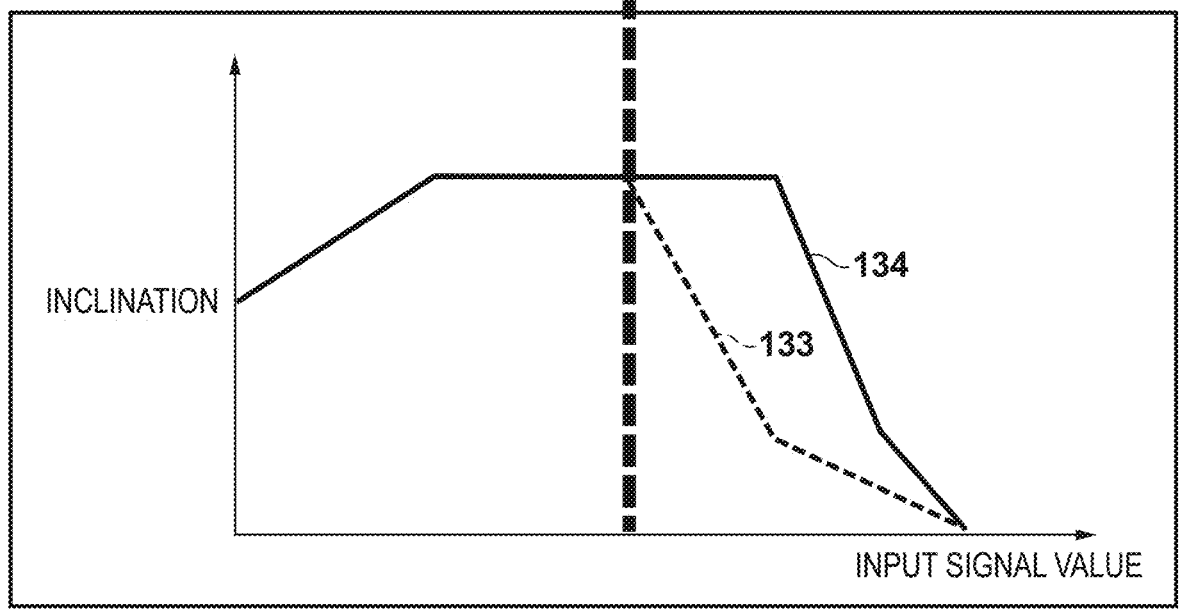

FIG. 13A is a conceptual diagram of gamma curves that respectively correspond to the cases where shooting has been performed in shooting modes with different peak luminances, and FIG. 13B is a conceptual diagram of changes in the inclination between the shooting modes at that time. In FIG. 13A, a horizontal axis represents an input signal value, and a vertical axis represents an I value. In FIG. 13B, a horizontal axis represents an input signal value, and a vertical axis represents an inclination. A gamma curve 131 corresponds to a shooting mode with a peak luminance that serves as a reference. Here, assume a case where shooting has been performed in a shooting mode with a peak luminance higher than that of the gamma curve 131, as indicated by a gamma curve 132. Reference sign 133 indicates a change in the inclination of the gamma curve 131, and reference sign 134 indicates a change in the inclination of the gamma curve 132. As shown in here, using an input signal value 135 as a threshold, a difference (discrepancy) arises in the inclination in a range of higher luminances than the threshold. Although the first embodiment has focused on the difference in the output value, the difference in the inclination also arises in the same luminance range. In the cases of the examples of FIGS. 13A and 13B, correction amounts are expanded in a range of luminances higher than the input signal value 135 in the second embodiment.

Figure 10A:
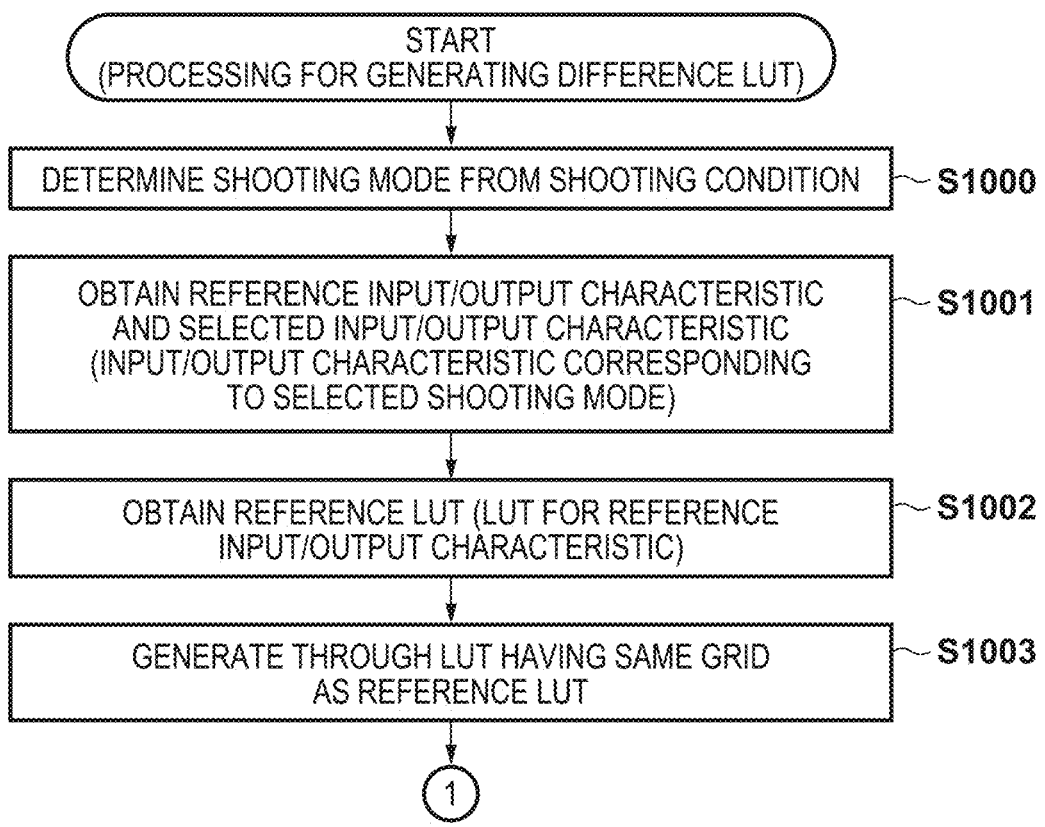
FIGS. 10A and 10B are flowcharts of processing for generating a difference LUT according to the first embodiment.
Figure 10B:
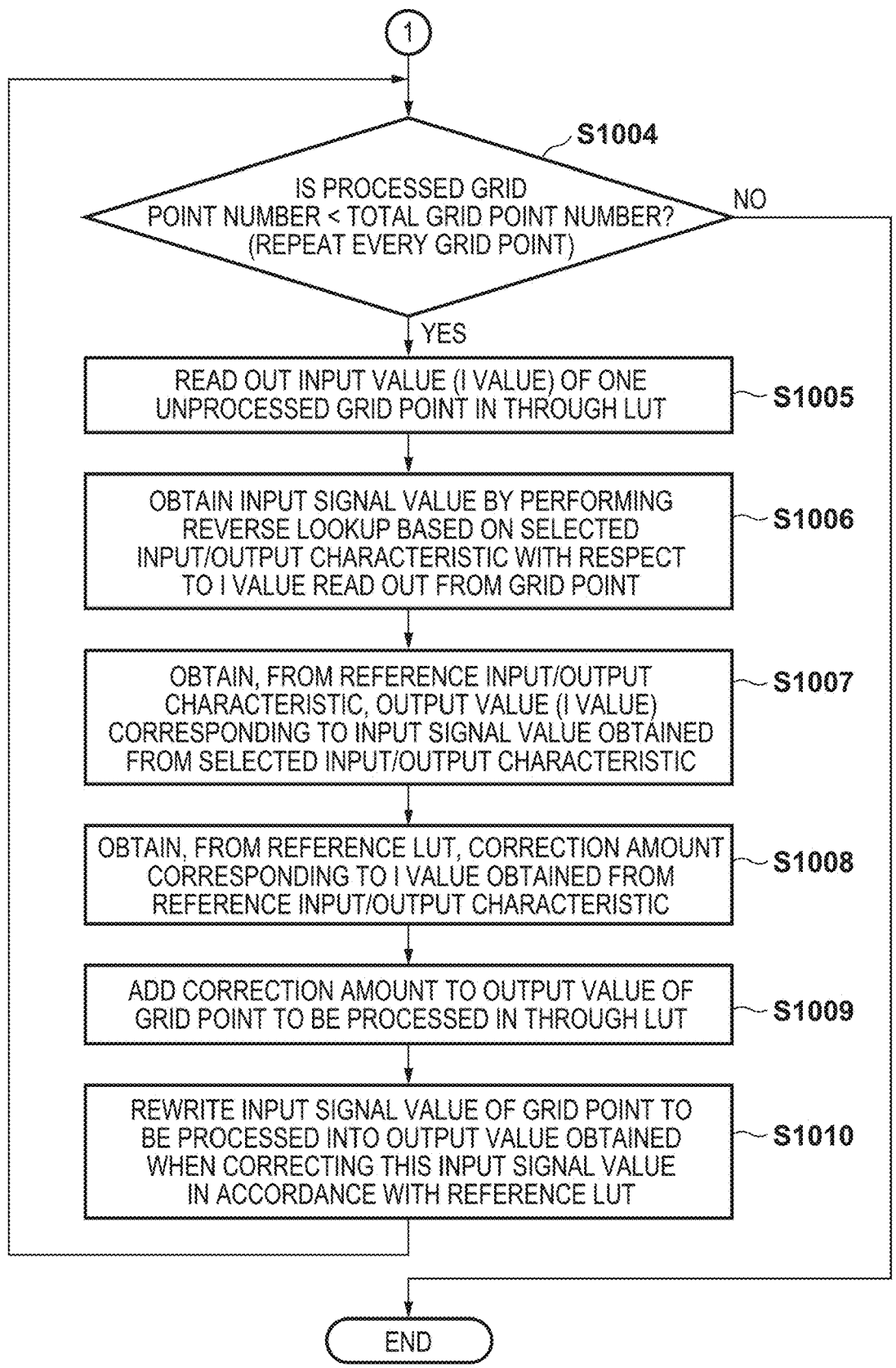
Figure 15A:
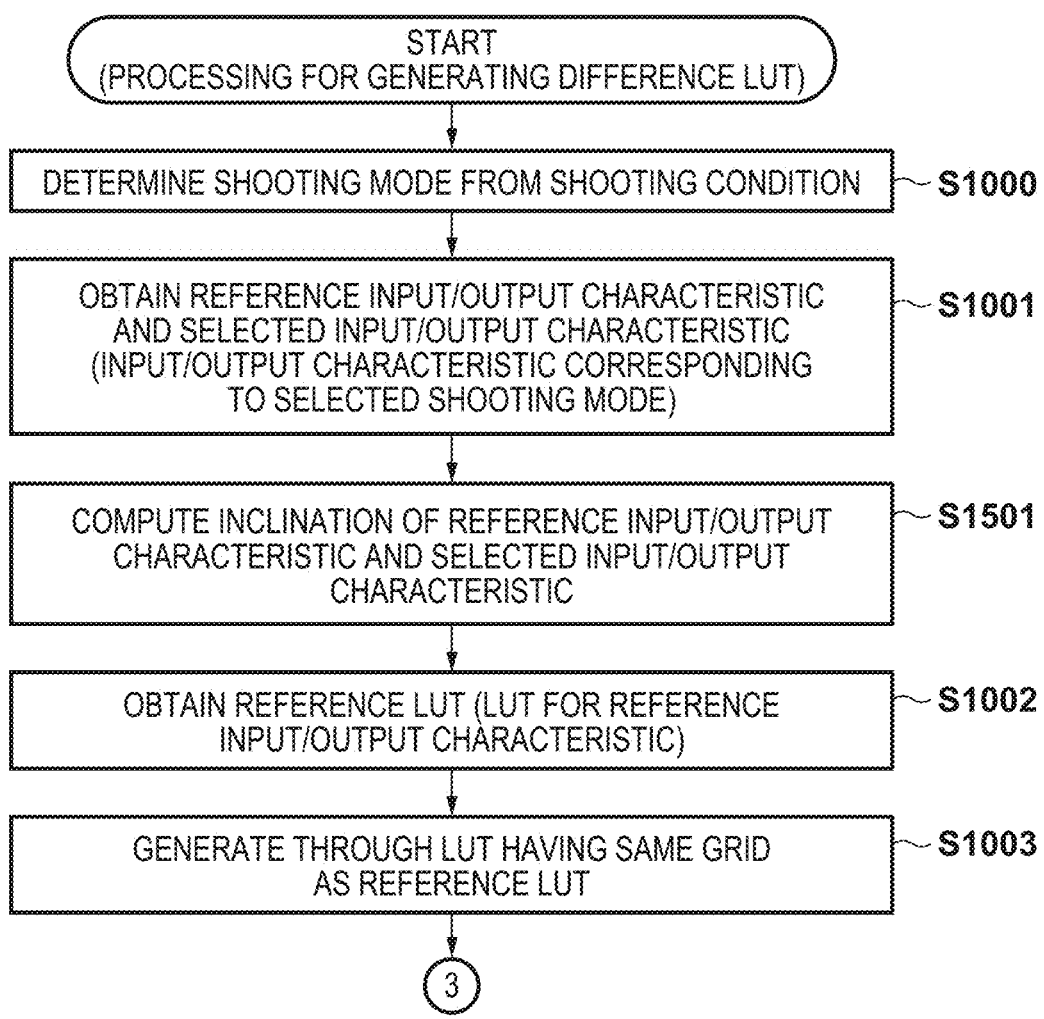
FIGS. 15A and 15B are flowcharts of processing for generating a difference LUT according to the second embodiment.
Figure 15B:
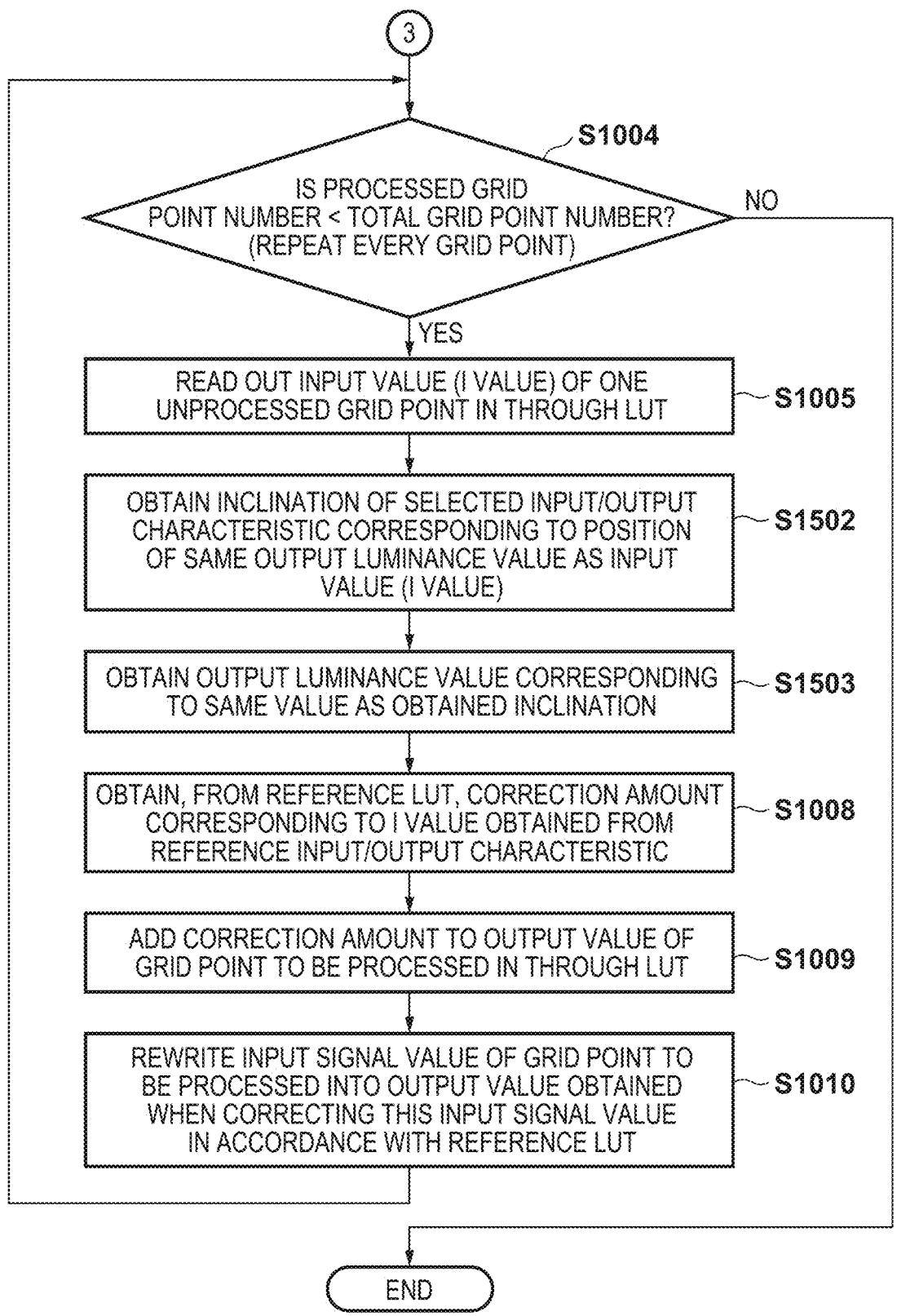

With reference to FIGS. 15A, 15B, 16A, and 16B, the following describes the details of processing performed by the difference LUT generation unit 124 for generating the difference LUT. In FIGS. 15A and 15B, steps in which processing that is the same as or similar to that of FIGS. 10A and 10B is performed have the same reference signs as in FIGS. 10A and 10B.

In step S1501, the difference LUT generation unit 124 computes inclinations with respect to each of the reference input/output characteristic and the selected input/output characteristic, and associates them with the respective input/output values. The inclinations are obtained using the following Expression 1.

Inclination=(($I$ value in the second input signal value)−($I$ value in the first input signal value))/((the second input signal value that is larger than the first input signal value)−(the first input signal value)) (Expression 1)

In step S1502, using the I value that was read out in step S1005 as an output luminance value of the selected input/output characteristic, the difference LUT generation unit 124 obtains an inclination of the selected input/output characteristic corresponding to the position of this output luminance value. For example, as indicated by reference sign 1601 of FIG. 16A, when the I value (IN in the through LUT) that was read out in step S1005 is 32, the inclination of the selected input/output characteristic corresponding to the position of the output luminance value 32 is 2.

In step S1503, the difference LUT generation unit 124 obtains an output luminance value that, in the reference input/output characteristic, corresponds to the same value as the inclination that was obtained in step S1502. When a plurality of output luminance values correspond to the same value as the inclination that was obtained in step S1502, the difference LUT generation unit 124 selects the smallest value among the plurality of output luminance values. In the case of the example of FIGS. 16A and 16B, as indicated by reference sign 1602, an output value (I value) 18 corresponding to the inclination 2 in the reference input characteristic is obtained.

Subsequent processing is similar to that of the first embodiment. That is, in the case of the example of FIGS. 16A and 16B, in step S1008, "+1" is obtained as a correction amount as indicated by reference sign 1603. In step S1009, as indicated by reference sign 1604, "+1" is added to an output value corresponding to an input signal value "32", thereby associating the input signal value "32" with an output value "33" in the through LUT. In step S1010, as indicated by reference sign 1605, the input signal value "32" is rewritten into "32" (in the case of this example, the numeric value is the same before and after the rewrite). As a result, the difference LUT having a grid point at which the input signal value "32" and the output value "33" are associated with each other is generated.

Note that similarly to the first embodiment, when the LUTs have fixed grids, values can be obtained through interpolation from the preceding and succeeding characteristics. Furthermore, in a case where a target value does not exist at the time of, for example, obtaining a correction amount from the reference LUT based on an output value (I value), the value can be calculated through interpolation processing on an as-needed basis.

Figure 14:
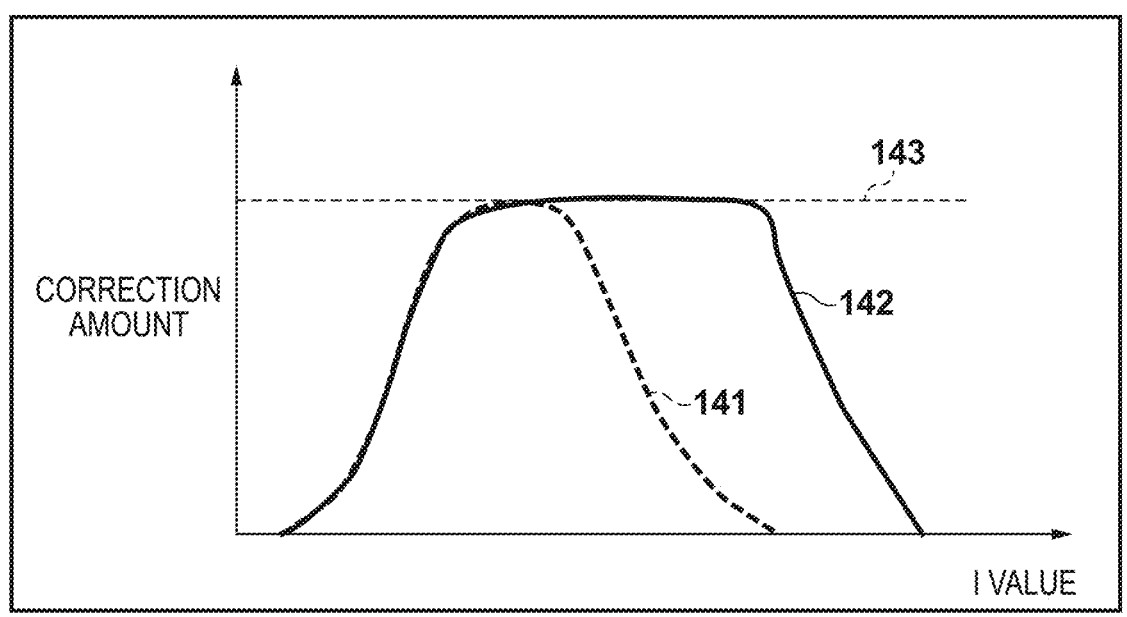
FIG. 14 is a diagram showing a difference between a reference LUT and a composite LUT according to the second embodiment.

Thereafter, the LUT composition unit 113 composites the difference LUT and the reference LUT. As a result, the expansion of the correction amounts shown in FIG. 14 is executed with respect to the reference LUT. FIG. 14 is a diagram showing a difference between the reference LUT and the composite LUT according to the second embodiment. In FIG. 14, a horizontal axis represents an I value, and a vertical axis represents a correction amount. A correction amount 141 represents a correction amount according to the reference LUT, and a correction amount 142 represents a correction amount according to the composite LUT. As shown in here, also when the difference LUT is generated based on a difference in the inclination of the output luminance value, the correction range can be expanded even in a high-luminance range that is outside the correction range of the reference LUT, similarly to the first embodiment. Furthermore, in the second embodiment, the same correction amount can be used in a luminance range that has the same inclination as the reference input/output characteristic having a peak luminance that servers as a reference. Therefore, while a linear region extends further in the gamma curve 132 than in the gamma curve 131 in FIGS. 13A and 13B, a constant correction amount can be used in this linear region as indicated by reference sign 143.

OTHER EMBODIMENTS

Although the first embodiment and the second embodiment have been described in relation to luminance correction with the assumption of HDR using the PQ method, correction amounts can be expanded also by using the HLG method with a similar approach. Furthermore, the approaches described in the first embodiment and the second embodiment are not limited to a composite LUT corresponding to a difference between the shooting modes of HDR, and are also applicable to, for example, processing for generating a composite LUT corresponding to a difference in the peak luminance between SDR and HDR.

Furthermore, in the first embodiment and the second embodiment, at the time of a shooting mode having an input/output characteristic with a high peak luminance, correction amounts are expanded using correction information of a reference shooting mode having an input/output characteristic with a low peak luminance (the reference LUT). However, the above-described configurations are applicable also when the magnitude relationship between these peak luminances is reversed (in this case, the correction range is reduced in consequence).

Furthermore, although the first embodiment and the second embodiment are based on the premise of LUTs and input/output characteristics (gamma data) for I values calculated from the ICtCp color space, similar processing can be applied also with respect to the RGB color space and the YUV color space.

Furthermore, although the first embodiment and the second embodiment are based on the premise of correction processing for luminance components (I values) of a color image, similar processing can be applied also with respect to processing for color components (chroma and hue). The chroma and hue can be obtained from Expression 2 and Expression 3, respectively, using Ct values and Cp value, which are color components of the ICtCp color space. In the case of correction processing for such color components, for example, in the first embodiment, after an I value is obtained using the same approach until step S1007 of FIG. 10B (corresponding to reference sign 1102 of FIG. 11A), a correction amount for a Ct value and a Cp value is obtained based on this I value. Although omitted in FIGS. 11A and 11B for the sake of the description of the first embodiment, as an LUT for color/luminance adjustment contains an LUT for correction of Ct values and Cp values as well, the same in the reference LUT is referred to in performing rewriting processing for a through LUT for CtCp.

$$\text{Chroma} = \sqrt{(Ct^2 + Cp^2)} \quad \text{(Expression 2)}$$

$$\text{Hue} = (\tan(Cp/Ct)^{\wedge}(-1)) \quad \text{(Expression 3)}$$

Figure 11B:
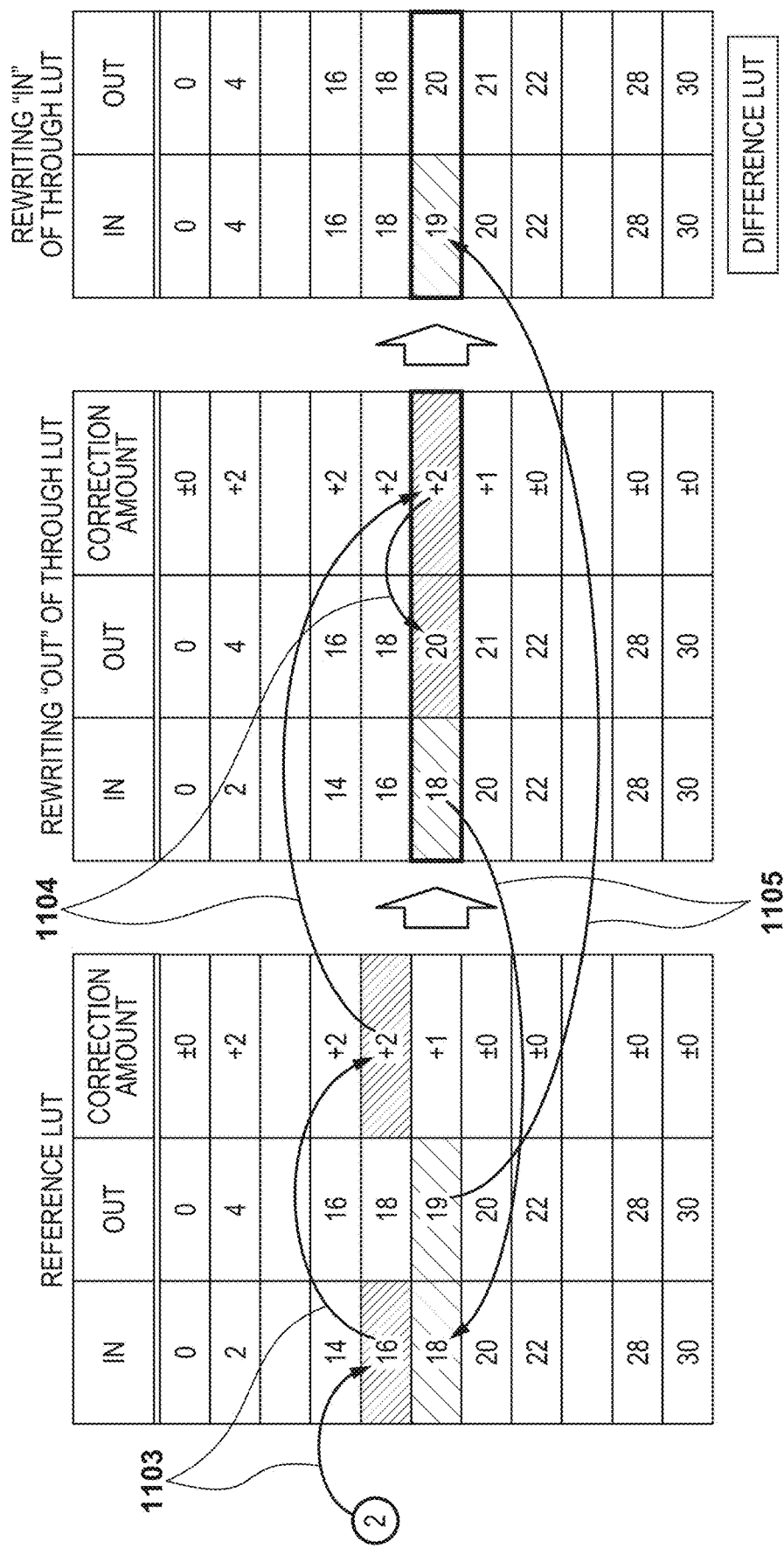
Figure 16A:
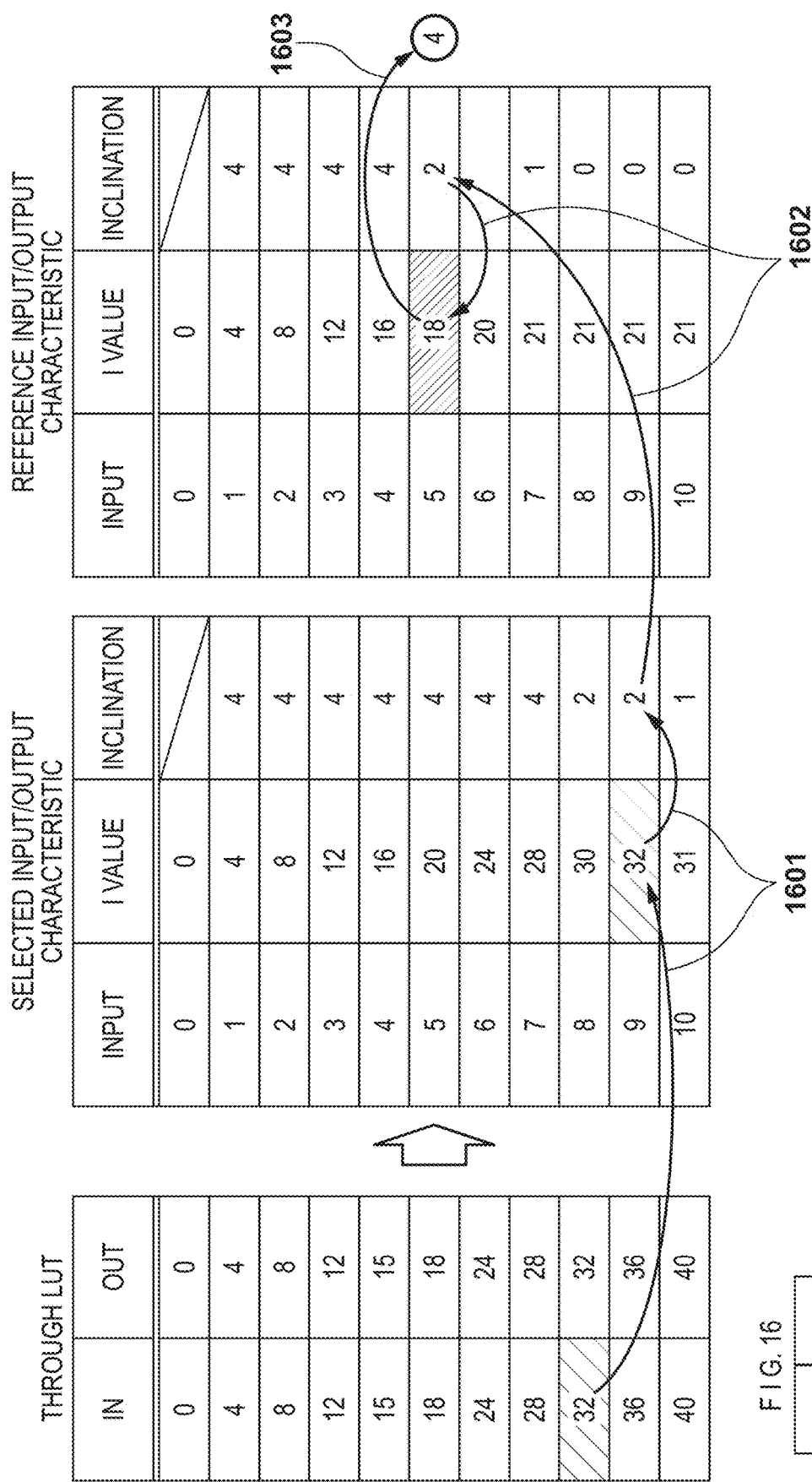
FIGS. 16A and 16B are diagrams for describing the processing for generating the difference LUT according to the second embodiment.
Figure 16B:
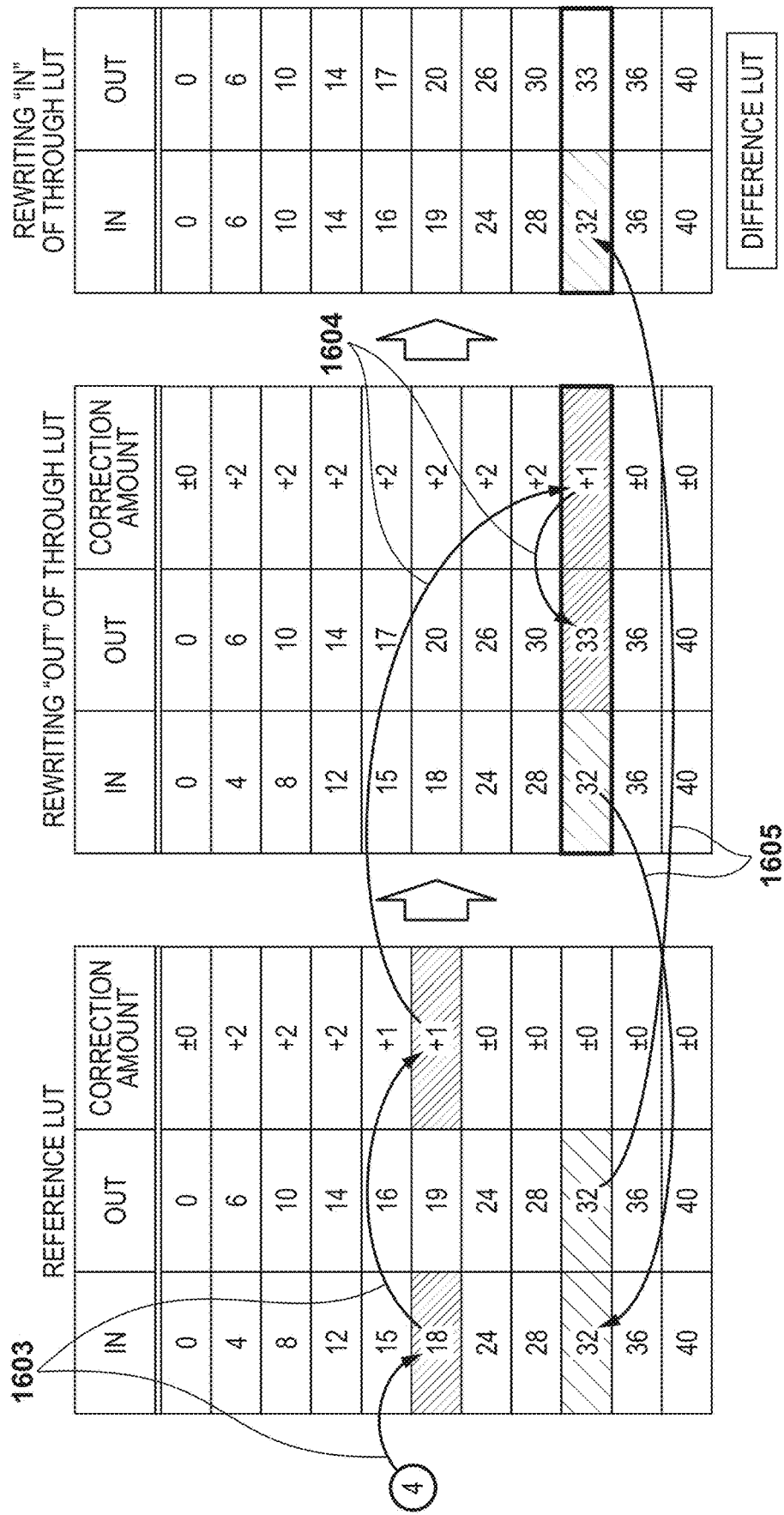

Furthermore, in the first embodiment and the second embodiment, the difference LUT is generated by rewriting the input values in the through LUT after rewriting the output values in the through LUT (see reference signs 1104, 1105, 1604, 1605 of FIG. 11B and FIG. 16B). However, when rewriting an output value in the through LUT, a correction amount that corresponds to the reference input/output characteristic in the reference LUT may be subtracted from the output value, and then this correction amount may be added to both of an input value and the output value. For example, in the case of the example of FIGS. 11A and 11B, in processing indicated by reference sign 1104, the difference LUT generation unit 112 obtains a correction amount "+1" that corresponds to an input value 18 in the reference LUT. Then, instead of rewriting an output value in the through LUT from 18 into 20, the difference LUT generation unit 112 performs a rewrite into "19", which is obtained by subtracting the correction amount "+1" from 20. Thereafter, in processing indicated by reference sign 1105, the difference LUT generation unit 112 adds the correction amount "+1" to each of the input value "18" and the output value "19", thereby generating the difference LUT in which the input value "19" is associated with the output value "20".

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-165430, filed Sep. 4, 2018 which is hereby incorporated by reference herein in its entirety.

What is claimed is:

1. An image processing apparatus comprising at least one processor and/or at least one circuit which function as:

an obtaining unit configured to obtain a first image to which tone conversion processing conforming to a first input/output characteristic having a first maximum output luminance value has been applied;

a generation unit configured to generate first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied; and a correction unit configured to correct a luminance value of the first image in conformity to the first correction information, wherein the generation unit generates the first correction information based on differences in inclinations of output luminance values, for respective input values, between the first input/output characteristic and the second input/output characteristic, and on the second correction information.

2. The image processing apparatus according to claim 1, wherein the generation unit determines a first information portion that is in the first correction information and is for correcting a first luminance value based on a second information portion that is in the second correction information and is for correcting a second luminance value, and the second luminance value is an output luminance value of the second input/output characteristic corresponding to an inclination of the first input/output characteristic corresponding to a position at which an output luminance value is the first luminance value.

3. An image processing apparatus comprising at least one processor and/or at least one circuit which function as:

an obtaining unit configured to obtain a first image to which tone conversion processing conforming to a first input/output characteristic having a first maximum output luminance value has been applied;

a generation unit configured to generate first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied; and a correction unit configured to correct a luminance value of the first image in conformity to the first correction information, wherein the generation unit generates the first correction information based on differences in output luminance values, for respective input values, between the first input/output characteristic and the second input/output characteristic, and on the second correction information, the generation unit determines a first information portion that is in the first correction information and is for correcting a first luminance value based on a second information portion that is in the second correction information and is for correcting a second luminance value, the second luminance value is an output luminance value that, in the second input/output characteristic, corresponds to an input value that corresponds to the first luminance value in the first input/output characteristic, and the generation unit determines the first information portion so that a correction amount for the first luminance value conforming to the first information portion is equal to a correction amount for the second luminance value conforming to the second information portion.

4. The image processing apparatus according to claim 3, wherein the generation unit further generates third correction information that includes a third information portion for correcting a third luminance value into a fourth luminance value, the third luminance value being obtained by correcting the first luminance value in conformity to the second correction information, the fourth luminance value being obtained by correcting the first luminance value in conformity to the first correction information.

5. The image processing apparatus according to claim 1, wherein output luminance values of the first input/output characteristic and the second input/output characteristic are I values in an ICtCp color space.

6. An image capturing apparatus, comprising:

the image processing apparatus according to claim 1; and at least one processor and/or at least one circuit which function as:

an image capturing unit; and an image generation unit configured to generate the first image by applying the tone conversion processing conforming to the first input/output characteristic to an image generated by the image capturing unit.

7. An image processing method executed by an image processing apparatus, comprising:

obtaining a first image to which tone conversion processing conforming to a first input/output characteristic having a first maximum output luminance value has been applied;

generating first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied; and correcting a luminance value of the first image in conformity to the first correction information, wherein the generating step generates the first correction information based on differences in inclinations of output luminance values, for respective input values, between the first input/output characteristic and the second input/output characteristic, and on the second correction information.

8. A non-transitory computer-readable storage medium which stores a program for causing a computer to execute an image processing method comprising:

obtaining a first image to which tone conversion processing conforming to a first input/output characteristic having a first maximum output luminance value has been applied;

generating first correction information for correcting a luminance value of the first image based on a difference regarding an output luminance value between the first input/output characteristic and a second input/output characteristic having a second maximum output luminance value, and on second correction information for correcting a luminance value of a second image to which tone conversion processing conforming to the second input/output characteristic has been applied; and correcting a luminance value of the first image in conformity to the first correction information, wherein the generating step generates the first correction information based on differences in inclinations of output luminance values, for respective input values, between the first input/output characteristic and the second input/output characteristic, and on the second correction information.

9. The image processing apparatus according to claim 3, wherein output luminance values of the first input/output characteristic and the second input/output characteristic are I values in an ICtCp color space.

* * * * *